Patented Jan. 13, 1948

2,434,289

UNITED STATES PATENT OFFICE 2,434,289

MANUFACTURE OF HYDROCARBONS

Louis Schmerling, Riverside, Ill., assignor to Universal Oil Products Company, Chicago, Ill., a corporation of Delaware No Drawing. Application July 17, 1944,
Serial No. 545,407

12 Claims. (Cl. 260—666)

This invention relates to the manufacture of pure hydrocarbons and more particularly to a conversion process which involves a series of co-operative and interdependent steps to produce pure hydrocarbons of specific structure.

Broadly this invention relates to a process for manufacturing a pure hydrocarbon of desired chemical structure which comprises reacting an olefinic hydrocarbon with a monohaloalkane to produce a halogenated saturated hydrocarbon and converting said halogenated saturated hydrocarbon to the desired pure hydrocarbon by a reaction with a metal.

An object of my invention is to prepare pure hydrocarbon compounds of particular chemical structure, while a further object of the invention is to provide a simple economical method for preparing such hydrocarbons.

To accomplish these objectives of my invention I react an olefinic hydrocarbon with a monohaloalkane in the presence of a halide catalyst of the Friedel-Crafts type to form a halogenated saturated hydrocarbon and subsequently effect the conversion of the halogenated saturated hydrocarbon to the desired hydrocarbon by any one of a number of methods in which a metal is consumed.

In one embodiment the present invention is directed to a process for the manufacture of a pure hydrocarbon of specific chemical structure which comprises reacting an olefin with a lower boiling alkyl halide in the presence of a metal halide catalyst of the Friedel-Crafts type to produce a higher molecular weight alkyl halide and subjecting said higher molecular weight alkyl halide to reaction with a metal to yield the desired pure hydrocarbon.

In another embodiment this invention relates to a process for the manufacture of a pure hydrocarbon which comprises reacting an olefinic hydrocarbon with a lower boiling halonaphthene in the presence of a metal halide catalyst of the Friedel-Crafts type to produce a higher boiling halonaphthene and subjecting said higher boiling halonaphthene to reaction with a metal to yield the desired hydrocarbon.

From this brief description of the invention and the embodiments set forth, it may be seen that my invention offers a novel method for manufacturing a pure hydrocarbon having a specific structure. In accordance with the principles of the invention the olefinic hydrocarbon and the monohaloalkane to be reacted are so selected that the final product of the process will comprise a hydrocarbon of the desired chemical structure.

In the first step of the process of my invention the olefinic hydrocarbons which may be employed comprise normally gaseous or normally liquid hydrocarbons and include ethylene, propylene, butylene and normally liquid olefins, the latter including various polymers of normally gaseous olefinic hydrocarbons. These aliphatic olefinic hydrocarbons may be obtained from any source, for example, from the products of catalytic and thermal cracking of oils, by dehydrogenation of paraffinic hydrocarbons, or by dehydrating alcohols.

Monohaloalkanes which are suitable for use in my invention include lower molecular weight alkyl halides containing more than two carbon atoms per molecule and monohalocycloalkanes. In general, tertiary halides are more reactive than the secondary halides which are in turn more reactive than primary halides. The preferred halides are the chlorides and bromides.

The haloalkanes which are utilizable in my invention may be prepared by the addition of hydrogen halide to a mono-olefinic hydrocarbon, the reaction generally being effective in the presence of a catalyst such as a Friedel-Crafts type metal halide, an acid such as sulfuric acid or an acid of phosphorus. Such an addition of a hydrogen halide to an olefin results in the production of secondary alkyl halides from nontertiary olefins containing three or more carbon atoms per molecule and in the formation of tertiary alkyl halides from tertiary olefins such as isobutene, trimethylethylene, etc. Primary alkyl halides, also utilizable in the present process for producing higher boiling alkyl halides, may be obtained by other means such as the treatment of a primary alcohol with a hydrogen halide in the presence of a suitable catalyst such as zinc chloride, etc. Primary alkyl bromides may be obtained from a 1-alkene or an α-olefin by the addition of hydrogen bromide in the presence of peroxides or sunlight. Alkyl chlorides and bromides having at least three carbon atoms per molecule are generally preferred for use in effecting condensation reactions with olefinic hydrocarbons although alkyl iodides and fluorides may also be utilized, though not necessarily under the same conditions of operation or with equivalent results.

Halocyclo-alkanes which may also be referred to as halonaphthenes, include halocyclopentanes, halocyclohexanes, halodecalins and other halogenated saturated cyclic hydrocarbon compounds. The halogenated naphthenes and particularly the chloronaphthenes, may be obtained from any suitable source. More specific examples of suitable halonaphthenes includes 1-chloro-1-methylcyclopentane, 1-chloro-1-methylcyclohexane and 9-chlorodecahydronaphthalene. The first two compounds may be prepared from the corresponding alcohols which may be synthesized by the reaction of methyl magnesium chloride on cyclopentanone and cyclohexanone, respectively. The above mentioned chlorodecalin may be obtained by the addition of hydrogen chloride to 9,10-octalin.

Another method for making tertiary halocycloalkanes consists in adding hydrogen halide to the double bond of a cyclo-olefin in which one of the hydrogen atoms on the doubly bonded carbon atom is substituted by an alkyl group; for example, the addition of hydrogen chloride to 1-methylcyclohexene-1 produces 1-chloro-1-methylcyclohexane.

Secondary halocyclo-alkanes may be prepared either from the appropriate alcohol or by the addition of hydrogen halide to the appropriate cyclo-olefin.

Halocyclo-alkanes which I prefer to employ in the present process comprise particularly the chloro- and bromo-cyclo-alkanes which sometimes are also herein referred to as chloro- and bromo-naphthenes. These halo-naphthenes may thus contain a cycloparaffin ring or a ring with at least one attached alkyl group, joined to a halogen atom having an atomic weight between 35 and 80.

Catalysts suitable for the first step of the process of this invention comprise metal halides of the Friedel-Crafts type and particularly anhydrous ferric chloride, bismuth chloride and zirconium chloride. More reactive metal halides such as aluminum chloride, aluminum bromide, etc., may also be used. Operating conditions employed with the different Friedel-Crafts metal halides or metal halide mixtures may vary depending upon the catalyst activity and other factors. The catalytic materials may be utilized as such or they may be composited with one another or disposed on solid carriers or supporting materials to produce catalyst composites of desired activities. Suitable catalyst carriers or supports include both adsorptive and substantially non-adsorptive materials such as alumina, activated charcoal, crushed porcelain, raw and acid-treated clays, diatomaceous earth, pumice, firebrick, etc. The carriers should be substantially inert in the sense that substantially no interaction which is detrimental to the activity or selectivity of the catalyst composite occurs between the carrier and the metal halide.

The production of higher boiling alkyl halides as herein set forth is effected by reacting a lower boiling alkyl halide with an olefin in the presence of a Friedel-Crafts type catalyst at a condensation temperature which will range from about −30 to about 125° C. and at a pressure sufficient to keep a substantial proportion of the reactants in liquid state.

The optimum reaction temperature selected for a particular condensation will depend upon the alkyl halide and the olefin used as well as on the catalyst. Thus, for example, lower temperatures from about −30 to about +50° C. are used when aluminum chloride or ferric chloride are employed than when bismuth chloride is the catalyst. Temperatures of from about 0° to about 100° C. are used with the latter.

In general, lower temperatures are utilizable with tertiary alkyl halides than with secondary halides which, in turn, are usually more reactive than primary halides. Higher temperatures are usually required with ethylene than with higher molecular weight olefins.

In carrying out the reaction of the first step of this process, it may be advisable to mix with the reacting haloalkane and olefin a small amount of a peroxide such as benzoyl peroxide, ascaridole, etc., to influence the manner in which an alkyl halide condenses with an olefin to produce higher boiling alkyl halides of the desired structure.

The reaction of an olefin with an alkyl halide in the presence of a catalyst may be carried out in either a batch or continuous type operation. A hydrogen halide, such as hydrogen chloride or hydrogen bromide, may also be introduced to the reaction zone with the olefin and alkyl halide charged. In a batch type operation the desired proportions of alkyl halide and olefin or alkyl halide and a hydrocarbon fraction containing olefinic hydrocarbons are introduced to a suitable reactor containing the Friedel-Crafts type catalyst as such or composited with a carrier and the resultant commingled materials are contacted until a substantial proportion of the reactants are converted into the desired higher molecular weight alkyl halides. After separation from the catalyst, the reaction mixture is fractionated to separate the unconverted olefinic hydrocarbon fraction and unconverted alkyl halide from the higher boiling alkyl halide product. The recovered olefinic hydrocarbon fraction and lower boiling alkyl halide may be reused in the process.

In a continuous operation, a mixture of an olefinic hydrocarbon and an alkyl halide is directed through a reactor of suitable design containing a stationary bed of granular Friedel-Crafts type catalyst. In this type of treatment the operating conditions may be suitably adjusted and may differ somewhat from those used in a batch operation.

It is sometimes advisable to commingle the charged alkyl halide and olefinic hydrocarbon with a substantially inert solvent such as a paraffinic hydrocarbon, for example, normal pentane, or a nitroparaffin, for example, nitromethane, and to effect the condensation in the presence of the added solvent. The solvent chosen, of course, should be one which does not itself undergo undesirable reaction at the operating conditions employed.

The conversion of the hydrocarbon halide condensation product to the desired hydrocarbon may be accomplished by any one of a number of methods in which a metal above hydrogen in the electromotive force series of elements is consumed, namely such metals as sodium, magnesium, aluminum, manganese, zinc, copper, iron, tin, etc. Preferred metals for the reaction are zinc, magnesium and sodium.

When employing zinc, the alkyl halide may be treated in various ways, for example, with zinc and alcohol or a dilute alcohol; with zinc and alkali or acetic acid; with zinc and a mixture of sodium iodide and sodium carbonate in acetamide or alcohol; or with a zinc-copper couple in the presence of an alcohol. These reactions utilizing zinc are carried out at temperatures from about 80 to about 200° C.

When employing sodium, the halogenated saturated hydrocarbon is treated with sodium and liquid ammonia or with sodium and an alcohol.

The alkyl halide may, if desired, be reacted with magnesium and an alcohol or a dilute alcohol.

A preferred method of employing magnesium when effecting the conversion of the halogenated saturated hydrocarbon to a pure saturated hydrocarbon is by means of a Grignard reaction. Although this is a relatively expensive method, it is particularly useful in the formation of saturated hydrocarbons from secondary and tertiary halides which are often converted to olefins by the other methods.

In accordance with this method, the halogenated saturated hydrocarbon formed by the reaction of a monohaloalkane and an olefin may be treated with magnesium to form the corresponding magnesium alkyl halide. This reaction is usually effected at atmospheric temperature or below. The temperature must not be too high as the resulting compound may decompose if heated to excessive temperatures. The reaction of magnesium and alkyl halide may be accelerated by the addition of a suitable catalyst. The Grignard reagent is then subjected to hydrolysis to yield the desired pure hydrocarbon.

Most of the primary halides when reacted with a metal as described above yield saturated hydrocarbons. With secondary halides the amount of unsaturated by-products increases and with tertiary halides they often tend to form the main product.

The following examples are introduced to illustrate the present invention but are not intended to limit unduly the broad scope of the invention.

Example I 1-bromo-3,3-dimethylbutane was prepared in 23% of the theoretical yield by the reaction of ethylene with 88 grams of t-butyl bromide at 70° C. and at 40 atmospheres pressure in the presence of 4 grams of bismuth chloride. The bromohexane boiled at 54° C. at 40 mm. pressure and at 138° C. at atmospheric pressure; refractive index $(n_D^{20})$ 1.440; density $(d_4^{20})$ 1.1556. A solution of 18 grams of the bromohexane in 32 grams of n-butanol was refluxed with an excess of zinc dust for four hours. The temperature of the refluxing vapors dropped from 88 to 51° C. in 30 minutes. The product boiling at 50–60° C. was then taken off overhead and redistilled over sodium. An 80% yield (7 grams) of neohexane (2,2-dimethylbutane) was obtained; boiling point, 49–50° C.; $n_D^{20}$, 1.3688.

Example II

Ethylene was bubbled through a well-stirred mixture of 102 grams of t-amyl bromide, 50 grams of n-pentane diluent and 3 grams of aluminum chloride at about −20° C. until 35 grams of ethylene was absorbed. The liquid product was decanted from the catalyst layer, washed, dried and distilled. There was obtained 48 grams (40% of the theoretical yield) of 1-bromo-3,3-dimethylpentane (boiling point, 51–52° C. at 10 mm.; $n_D^{20}$, 1.4546) and 30 grams (20% of the theoretical) of a primary nonyl bromide (boiling point, 60–61° C. at 3 mm.; $n_D^{20}$, 1.4630). A solution of 10 grams of the bromodimethylpentane in 30 cc. of propanol was refluxed over 6 grams of zinc dust for four hours. An azeotrope boiling at 79–95° C. was distilled off, washed with water and the insoluble layer dried and distilled. There was obtained 4 grams (70% of the theoretical yield) of heptane boiling at 85–86° C. and having a refractive index $(n_D^{20})$ 1.3918. The infra-red spectrum of the heptane showed that it was 3,3-dimethylpentane of over 99% purity.

Example III

A solution of 50 cc. of isopropyl alcohol and 15 grams of the bromononane obtained by the reaction of t-amyl bromide and ethylene as described in Example II was refluxed over 6 grams of zinc dust for 20 hours. The product was washed free of alcohol, dried and distilled. There was obtained 8 grams of nonane boiling at 138–139° C. and having a refractive index $(n_D^{20})$ of 1.4150. The nonane probably had the structure 3,3,4-trimethylhexane.

Example IV 2-chloro-4,4-dimethylpentane was prepared in about 25% of the theoretical yield by contacting 140 grams of t-butyl chloride, 75 grams of propylene and 8 grams of bismuth chloride in a rotating autoclave at room temperature for four hours. The chloroheptane which boiled at 129–131° C. was converted to the Grignard reagent by reaction with magnesium and dry ether. Hydrolysis of the product by the addition of a 10% solution of ammonium chloride yielded pure 2,2-dimethylpentane boiling at 80° C. and having a refractive index $(n_D^{20})$ of 1.3821.

Example V

Ethylene was bubbled through a well stirred mixture of 32 grams of 1-chloro-1-methylcyclohexane, 42 grams of n-pentane diluent and 3 grams of aluminum chloride at about −25° C. until 15 grams of ethylene was absorbed. The liquid product was decanted from the catalyst sludge (8 grams) and washed, dried and distilled. There was obtained 18 grams of 1-(β-chloroethyl)-1-methylcyclohexane, which boiled chiefly at 63–64° C. at 3.5 mm. pressure and at 204–205° C. at atmospheric pressure; $n_D^{20}$, 1.4694; $d_4^{20}$, 0.9643; molecular refraction observed, 46.5; calculated for $C_9H_{17}Cl$, 46.4. Conversion of chloroethylmethylcyclohexane to the Grignard reagent followed by hydrolysis of the reagent yields 1-methyl-1-ethylcyclohexane, boiling at 140° C.

Example VI

Ethylene was passed into a mixture of 100 grams of sec. butyl bromide, 53 grams of normal pentane diluent and 8 grams of aluminum chloride at −20 to −15° C., during 1½ hours. During this time the reaction mixture increased 51 grams in weight. The liquid product was separated from 26 grams of yellow catalyst sludge, washed with water, dried and distilled. There was obtained 52 grams of 1-bromo-3-methyl-3-ethyl pentane, this compound being a new composition of matter. The 1-bromo-3-methyl-3-ethyl pentane had a boiling point of 72° C., at 10 mm. pressure, index of refraction $(n_D^{20})$ 1.4590 and density $(d_4^{20})$ 1.1112.

19 grams of the octyl bromide was refluxed with 55 cc. of isopropyl alcohol over 8 grams of zinc dust. There was obtained 6 grams of octane boiling at 115–116° C., index of refraction $(n_D^{20})$ 1.4060. The infra-red spectrum of this material indicated that it was essentially pure 3-methyl-3-ethyl pentane.

Example VII

The reaction of ethylene with 150 grams of bromocyclohexane at −20 to −10° C. in the presence of 10 grams of aluminum chloride using a procedure similar to that described in Examples V and VI yielded 64 grams of 1-(β-bromoethyl)-

1-ethylcyclohexane, which is a new composition of matter. This bromoethyl-ethylcyclohexane boiled at 85-86° C. at 3 mm. pressure and had an index of refraction ($n_D^{20}$) 1.4930. It was converted to 1,1-diethylcyclohexane, which is also a new composition of matter, by refluxing with n-propyl alcohol and zinc. The diethylcyclohexane boiled at 170-171° C. at atmospheric pressure and had an index of refraction ($n_D^{20}$) 1.443.

By the term "dehalogenating" as employed in the claims I mean replacing the halogen atom of a monohalogenated saturated hydrocarbon by a hydrogen atom.

I claim as my invention:

1. A process for the manufacture of 3,3-dimethylpentane which comprises reacting tertiary amyl bromide with ethylene in the presence of an aluminum chloride catalyst at a pressure sufficient to keep a substantial portion of the reactants in liquid state and at a temperature of from about −30° C. to about 125° C. to form 1-bromo-3,3-dimethylpentane and reacting said 1-bromo-3,3-dimethylpentane with zinc and propanol to produce the desired 3,3-dimethylpentane.

2. A process for the manufacture of 3-methyl-3-ethyl pentane which comprises reacting sec-butyl bromide with ethylene in the presence of an aluminum chloride catalyst at a pressure sufficient to keep a substantial portion of the reactants in liquid state and at a temperature of from about −30° C. to about 125° C. to form 1-bromo-3-methyl-3-ethyl pentane and reacting said 1-bromo-3-methyl-3-ethyl pentane with zinc and propanol to produce the desired 3-methyl-3-ethyl pentane.

3. A process for the manufacture of 1,1-diethylcyclohexane which comprises reacting bromocyclohexane with ethylene in the presence of an aluminum chloride catalyst at a pressure sufficient to keep a substantial portion of the reactants in liquid state and at a temperature of from about −30° C. to about 125° C. to form 1-($\beta$-bromoethyl)-1-ethylcyclohexane and reacting said 1-($\beta$-bromoethyl)-1-ethylcyclohexane with zinc and propanol to produce the desired 1,1-diethylcyclohexane.

4. A process for the production of saturated hydrocarbons which comprises reacting an aliphatic mono-olefin with a monohaloalkane in the presence of a metal halide catalyst of the Friedel-Crafts type at a pressure sufficient to keep a substantial proportion of the reactants in liquid state and at a temperature of from about −30° C. to about 125° C. to form a higher boiling monohalogenated saturated hydrocarbon and dehalogenating the latter.

5. A process for the production of naphthene hydrocarbons which comprises reacting an aliphatic mono-olefin with a monohalocycloalkane in the presence of a metal halide catalyst of the Friedel-Crafts type at a pressure sufficient to keep a substantial proportion of the reactants in liquid state and at a temperature of from about −30° C. to about 125° C. to form a higher boiling monohalogenated saturated hydrocarbon and dehalogenating the latter.

6. A process for the production of paraffin hydrocarbons which comprises reacting an aliphatic mono-olefin with an alkyl halide in the presence of a metal halide catalyst of the Friedel-Crafts type at a pressure sufficient to keep a substantial proportion of the reactants in liquid state and at a temperature of from about −30° C. to about 125° C. to form a higher boiling monohalogenated saturated hydrocarbon and dehalogenating the latter.

7. A process for the production of paraffin hydrocarbons which comprises reacting an aliphatic mono-olefin with a tertiary alkyl halide in the presence of a metal halide catalyst of the Friedel-Crafts type at a pressure sufficient to keep a substantial proportion of the reactants in liquid state and at a temperature of from about −30° C. to about 125° C. to form a higher boiling monohalogenated saturated hydrocarbon an dehalogenating the latter.

8. The process of claim 5 further characterized in that said higher boiling monohalogenated saturated hydrocarbon is reacted with zinc and an alcohol.

9. The process of claim 6 further characterized in that said higher boiling monohalogenated saturated hydrocarbon is reacted with zinc and an alcohol.

10. The process of claim 4 further characterized in that said catalyst comprises aluminum chloride.

11. The process of claim 4 further characterized in that said monohaloalkane contains at least three carbon atoms per molecule.

12. The process of claim 6 further characterized in that said alkyl halide contains at least three carbon atoms per molecule.

LOUIS SCHMERLING.

REFERENCES CITED

The following references are of record in the file of this patent:

UNITED STATES PATENTS

| Number | Name | Date |
| --- | --- | --- |
| 2,303,549 | Horney | Dec. 1, 1942 |

FOREIGN PATENTS

| Number | Country | Date |
| --- | --- | --- |
| 474,687 | Great Britain | Nov. 5, 1937 |

OTHER REFERENCES

Beilstein, V, 1st supplement, page 23. Copy in Division 6.

Richter, Org. Chem., vol. 1, pages 80, 81 and 83 (1921). Copy in Div. 31.

Beilstein, V., 2nd supp., page 20. Copy in Division 6.